US010935506B2

(12) United States Patent
Buijsse et al.

(10) Patent No.: US 10,935,506 B2
(45) Date of Patent: Mar. 2, 2021

(54) METHOD AND SYSTEM FOR DETERMINING MOLECULAR STRUCTURE

(71) Applicant: FEI Company, Hillsboro, OR (US)

(72) Inventors: Bart Buijsse, Eindhoven (NL); Abhay Kotecha, Eindhoven (NL)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 16/450,321

(22) Filed: Jun. 24, 2019

(65) Prior Publication Data

US 2020/0400594 A1   Dec. 24, 2020

(51) Int. Cl.
| | | |
|---|---|---|
| *G01N 23/20* | (2018.01) | |
| *G01N 23/04* | (2018.01) | |
| *G01N 23/205* | (2018.01) | |

(52) U.S. Cl.
CPC ....... *G01N 23/20083* (2013.01); *G01N 23/04* (2013.01); *G01N 23/205* (2013.01); *G01N 2223/401* (2013.01)

(58) Field of Classification Search
CPC ............. G01N 23/20083; G01N 23/04; G01N 23/205; G01N 2223/401; H01J 37/26; H01J 37/28; H01J 37/295; H01J 37/2955
See application file for complete search history.

(56) References Cited

U.S. PATENT DOCUMENTS

| | | | | |
|---|---|---|---|---|
| 5,353,236 A | * | 10/1994 | Subbiah | G01N 23/20 700/266 |
| 2008/0275655 A1 | * | 11/2008 | Moeck | G01N 23/20058 702/27 |
| 2011/0049363 A1 | * | 3/2011 | Koch | H01J 37/26 250/307 |
| 2015/0043802 A1 | * | 2/2015 | Baumann | G06T 7/0004 382/145 |
| 2017/0309441 A1 | * | 10/2017 | Flanagan, IV | H01J 37/265 |

OTHER PUBLICATIONS

Koch, Christoph T., "Many Beam Solution to the Phase Problem in Crystallography", arXiv:0810.3811v1 [cond-mat.mtrl-sci], http://arxiv.org/abs/0810.3811v1, 2008 (Year: 2008).*
Glaeser, R. M., Electron Crystallography of Biological Macromolecules, Ann. Rev. Phys. Chem., 1985, 243-75, Annual Reviews Inc., Berkeley, California, USA.
Hovmöller, Sven et al, Crystal Structure Determination from EM Images and Electron Diffraction Patterns, Advances in Imaging and Electron Physics, vol. 123, 2002, 257-289, Elsevier Science (USA), Aachen, Germany.
Glaeser, R.M., et al., Electron Crystallography of Biological Macromolecules, 2007, 246-276, Oxford University Press, Oxford, U.K.

(Continued)

*Primary Examiner* — David E Smith

(57) ABSTRACT

Molecular structure may be determined based on structure factors solved from the diffraction pattern and the electron microscopy image of the sample. In particular, the amplitudes of the structure factors may be determined based on intensities of diffraction peaks in the multiple diffraction patterns. The phases of the structure factors may be determined based on electron microscopy images and the intensities of the diffraction peaks.

18 Claims, 10 Drawing Sheets

(56) References Cited

OTHER PUBLICATIONS

Clabbers M T.B et al., "Electron diffraction and three-dimensional crystallography for structural biology", Crystallography Reviews, vol. 24, No. 3, XP055753702, Mar. 20, 2018, pp. 176-204.
EP20181297.1, Extended European Search Report, Dec. 15, 2020, 10 pages.
Glaeser R M et al., "High-resolution electron crystallography of protein molecules", Ultramicroscopy, vol. 52, Nos. 3-4, XP025826881, Dec. 1, 1993, pp. 478-486.
Palatinus L et al., "Stucture refinement from data acquired by electron diffraction tomography", Proceedings of the 2014 Czech and Slovak Crystallographic Association and Regional Committee of the IUCR Symposium, XP055754009, Jun. 12, 2014, pp. 1-4.
Zanetti G et al., "Contrast transfer function correction applied to cryo-electron tomography and sub-tomogram averaging", Journal of Structural Biology, Academic Press, vol. 168, No. 2, XP026851176, Nov. 1, 2009, pp. 305-312.

\* cited by examiner

METHOD AND SYSTEM FOR DETERMINING MOLECULAR STRUCTURE

The present description relates generally to methods and systems for determining molecular structure, and more particularly, to determining the molecular structure based on diffraction pattern and electron microscopy image.

BACKGROUND OF THE INVENTION

Molecular structure of organic molecules may be determined by its corresponding structure factors. The structure factors describe how the lattice of a crystal scatters an incident radiation. The 3D molecular structure of the molecule that forms the crystal may be resolved by determining the structure factors of the crystal. The scattered waves from the crystal interfere with each other and may form a two-dimension diffraction pattern. High intensities in the diffraction pattern are constructively formed when the scattering angles satisfy the Bragg condition. The structure factors include amplitudes and phases. Though the amplitudes of the structure factors may be obtained from the diffraction pattern, the phase information is lost. In order to solve the molecular structure, the phase information may be extracted from electron microscopy image of the crystal. In particular, the phase information may be read out from Fourier transform of the electron microscopy image.

SUMMARY

In one embodiment, a method for determining a molecular structure comprises acquiring multiple diffraction patterns of a sample while tilting the sample in a tilt angle range, determining an amplitude of a structure factor based on intensities of a diffraction peak in the multiple diffraction patterns; acquiring an electron microscopy (EM) image of the sample; determining a phase of the structure factor based on the EM image and the intensities of the diffraction peak in the multiple diffraction patterns; and determining the molecular structure of the sample based on the amplitude of the structure factor and the phase of the structure factor. In this way, the molecular structure may be solved from the diffraction patterns and the EM images of the sample. The sample may be a lamella prepared by milling a macro-crystal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Like reference numerals refer to corresponding parts throughout the several views of the drawings.

DETAILED DESCRIPTION OF EMBODIMENTS

The following description relates to systems and methods for determining a molecular structure based on diffraction patterns and electron microscopy (EM) images of a sample. In one example, the diffraction patterns and EM images may be acquired from an electron microscopy imaging system, such as the electron microscopy system of FIG. 1.

Figure 2A:
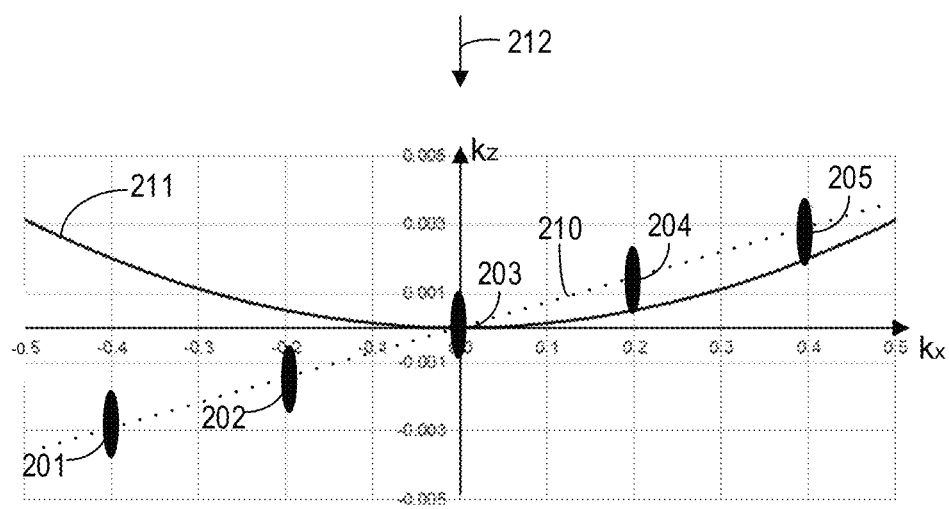
FIG. 2A illustrates example positions of reflections of a three-dimensional crystal and the Ewald sphere in the reciprocal space.

The molecular structure may be solved based on its structure factors in the reciprocal space, which is a Fourier transform of the real space. The structure factors include amplitudes and phases. Both the amplitudes of the structure factors and the phases of the structure factors are a three-dimensional (3D) dataset defined in the reciprocal space. Scattered waves from planes of the crystal lattice in the real space form reflections in the reciprocal space. Each reflection has a Friedel mate located centrosymmetric relative to the origin of the reciprocal space. The reflection and its Friedel mate form a Friedel pair. The reflections may be captured or sampled via 2D diffraction patterns. The diffraction peak in the diffraction pattern may only appear when its corresponding reflection overlaps with (or within a threshold distance from) the curved Ewald sphere in the reciprocal space, as shown in FIG. 2A. For a weak phase object, the amplitudes of the Friedel pair of the reflection in the diffraction pattern may have the same intensity. However, due to the curvature of the Ewald sphere, a single diffraction pattern may not capture the amplitudes of the Friedel pair of reflection. In other words, diffraction peaks in the diffraction pattern may not be centrosymmetric, as shown in the diffraction pattern of FIG. 2B. The Friedel pair of diffraction peak in the diffraction pattern may have different intensities. Therefore, the intensities of Friedel pair of structure factors may be different. Further, when determine the phases of the structure factors based on the EM images, additional phase shift caused by the unequal intensities of the Friedel pair of diffraction peak needs to be considered.

Figure 3:
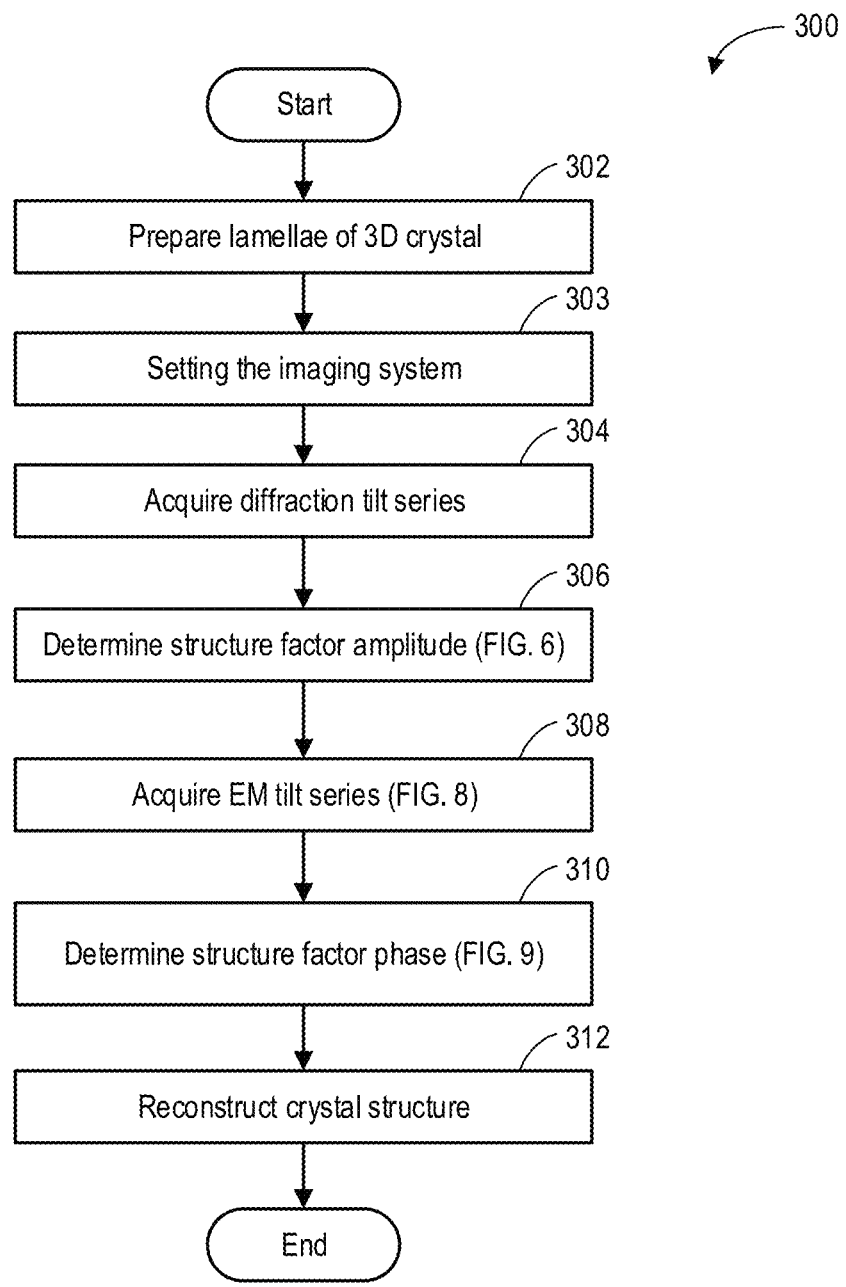
FIG. 3 is a high-level flow chart showing an example method for determining the molecular structure based on diffraction patterns and electron microscopy images.
Figure 4:
FIG. 4 illustrates example locations of a lamella for acquiring the diffraction patterns and the electron microscopy images.
Figure 5:
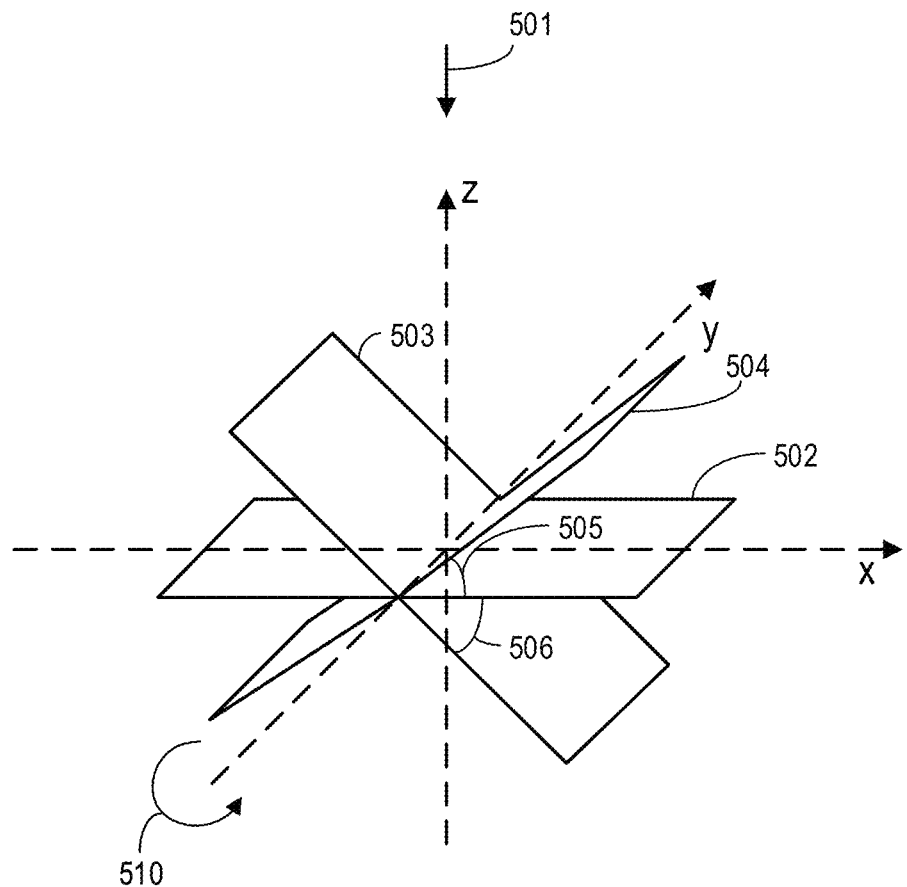
FIG. 5 illustrates a lamella at different tilt angles.
Figure 6:
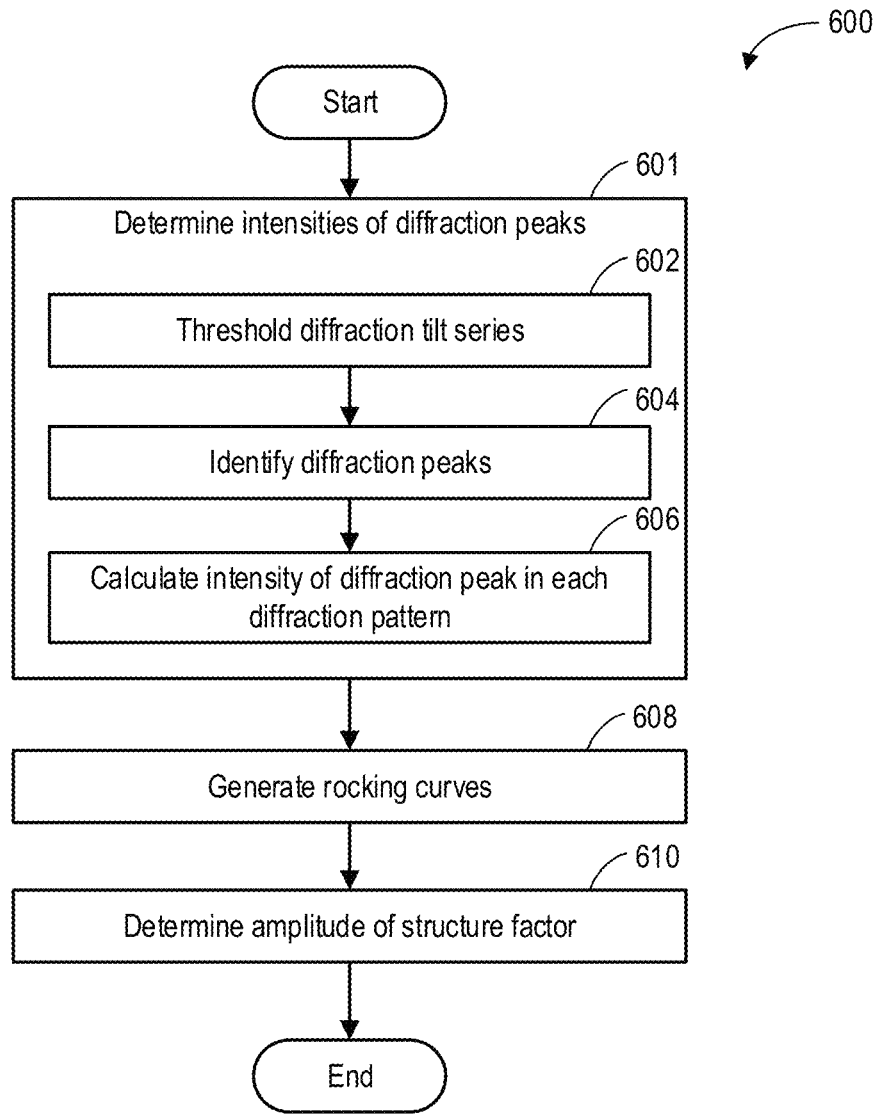
FIG. 6 is an example subroutine for acquiring diffraction tilt series.
Figure 7B:
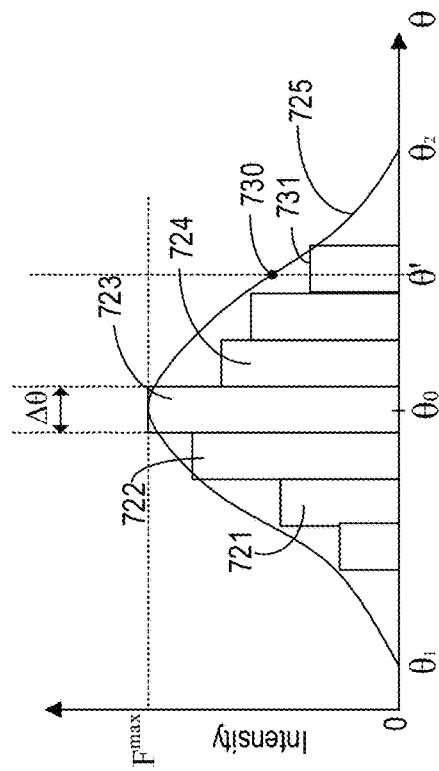
FIG. 7B shows a rocking curve generated for the diffraction peak of FIG. 7A.
Figure 7A:
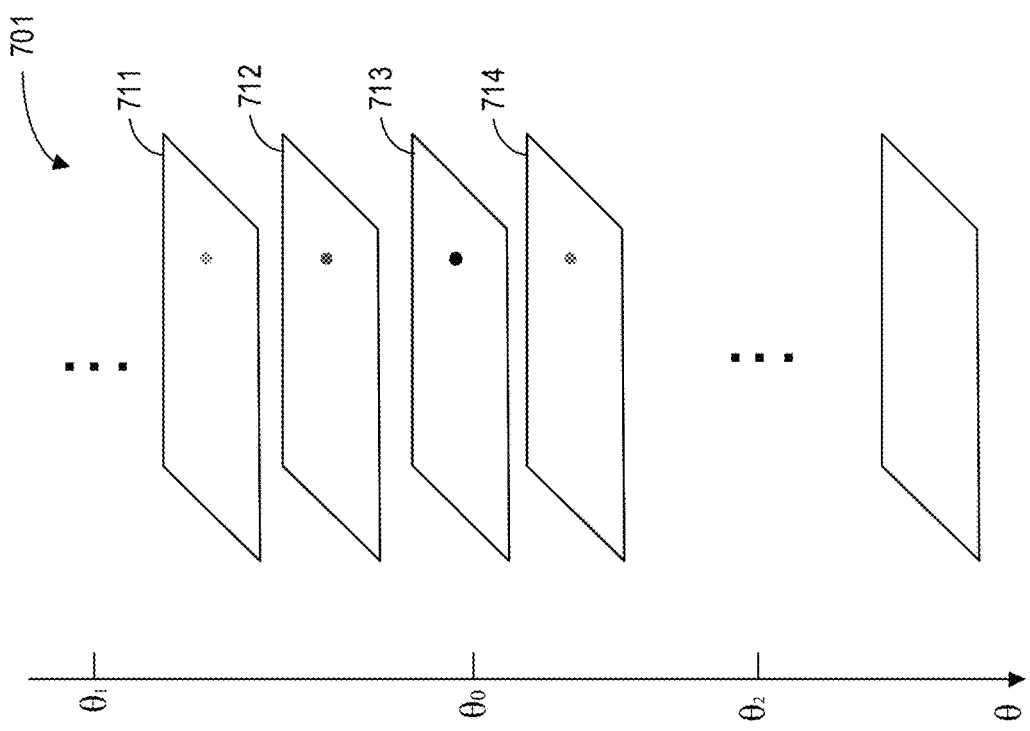
FIG. 7A illustrates a diffraction peak sampled in multiple diffraction patterns.
Figure 8:
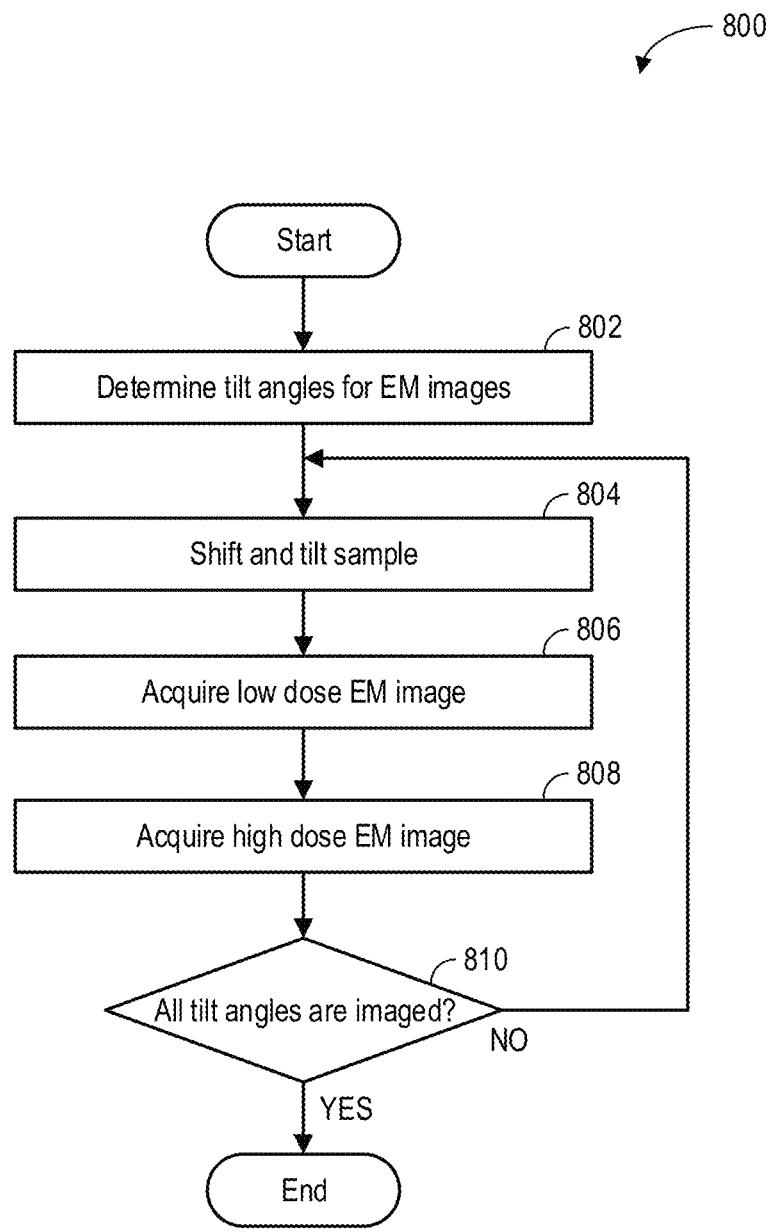
FIG. 8 shows an example subroutine for acquiring the election microscopy tilt series.
Figure 9:
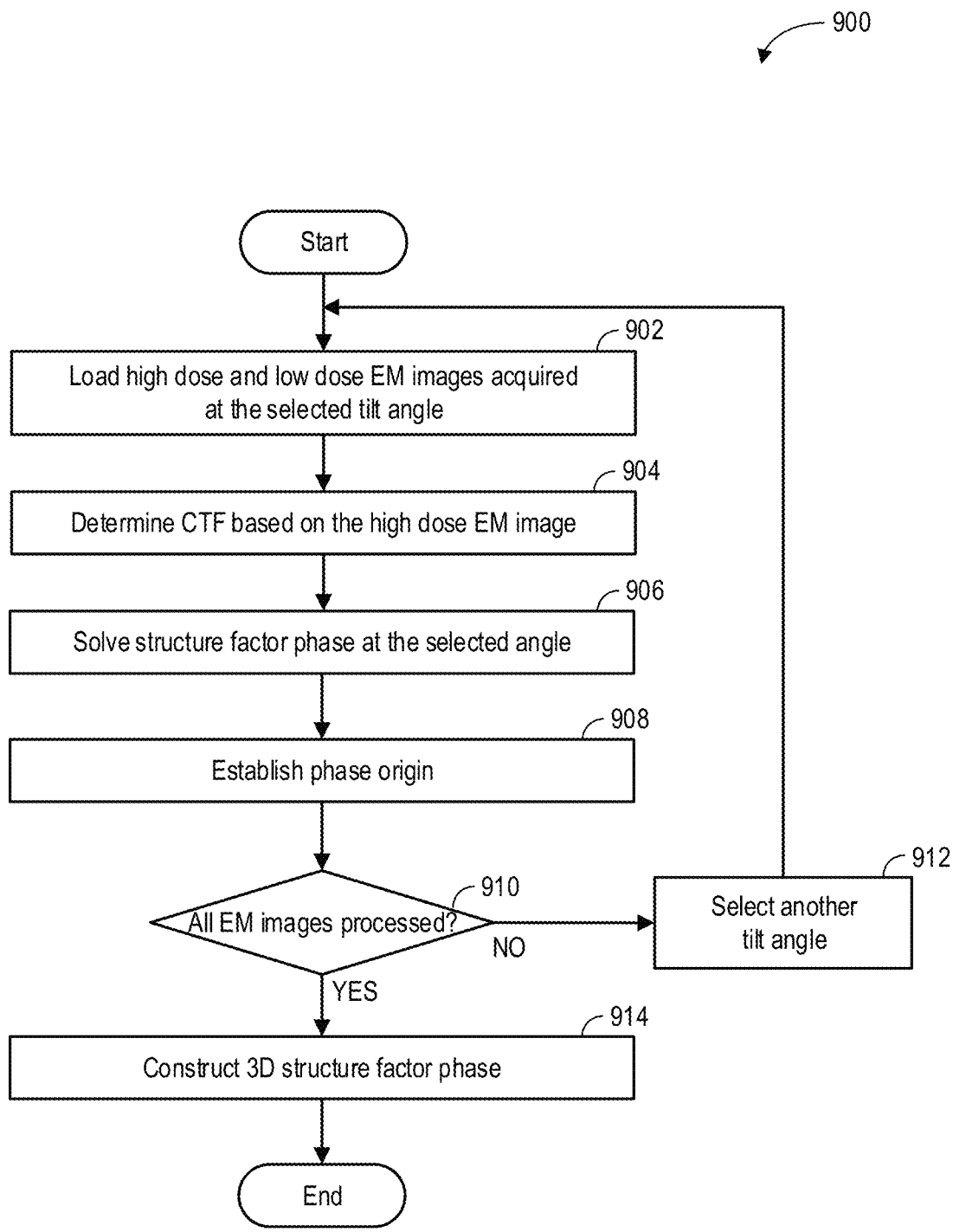
FIG. 9 shows an example subroutine for determining phase of the structure factor.
Figure 10A:
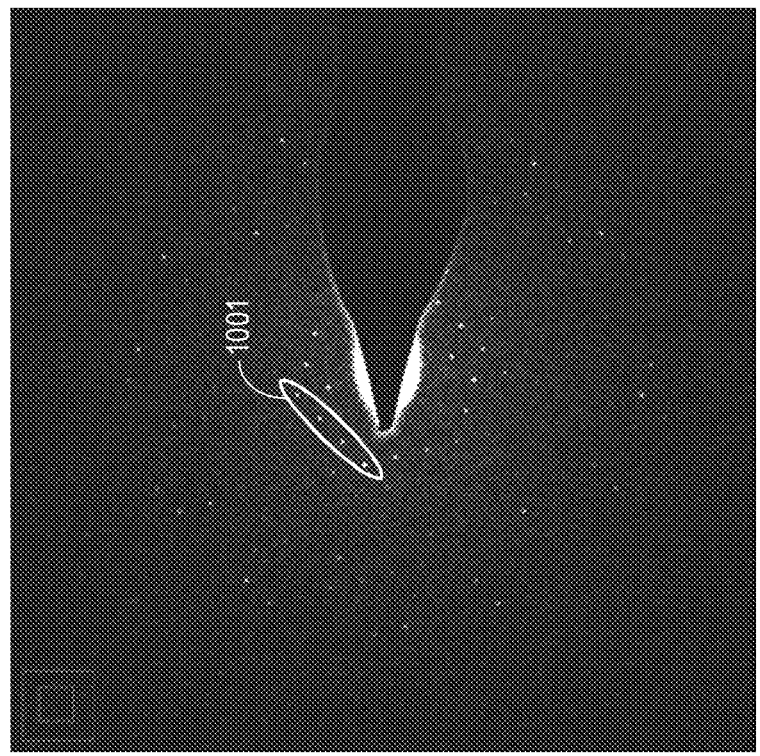
FIG. 10A shows an example diffraction pattern.
Figure 10B:
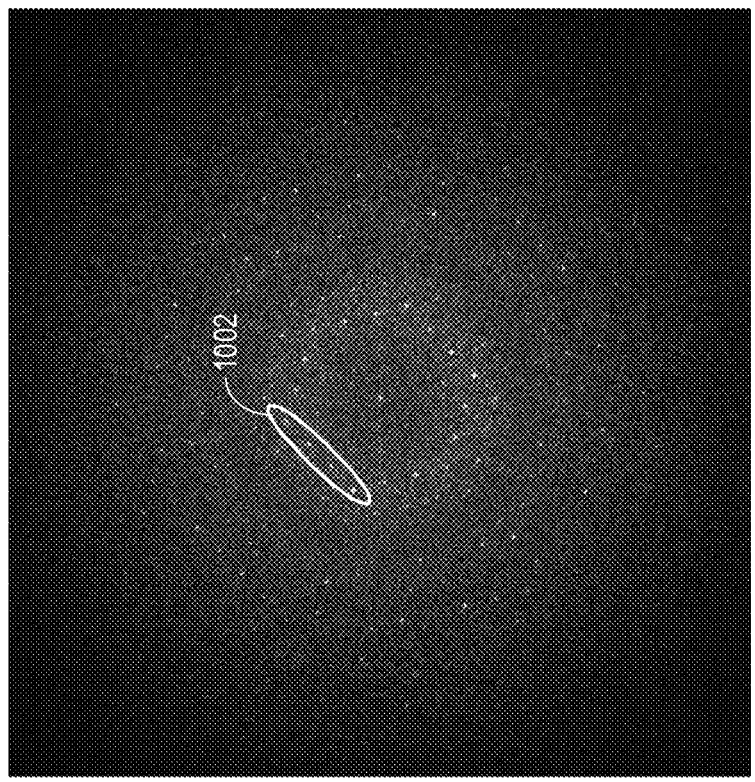
FIG. 10B shows Fourier transform of a low dose electron microscopy image acquired at the same tilt angle as FIG. 10A.

FIG. 3 shows an example method for determining the molecular structure of the 3D crystal based on a diffraction tilt series and an EM tilt series of the sample. The diffraction tilt series includes diffraction patterns acquired at multiple tilt angles, and the EM tilt series includes EM images acquired at multiple tilt angles. The sample may be in the form of a lamella. The amplitudes of the structure factor may be determined based on intensities of the diffraction peaks in the diffraction tilt series. The phase of the structure factor may be solved based on the EM images of the sample and the intensities of the diffraction peaks from the diffraction tilt series. FIG. 4 illustrates example locations on a lamella for acquiring the diffraction patterns and the EM images. FIG. 5 illustrates the lamella at different tilt angles. FIG. 6 shows a subroutine for determining the amplitude of the structure factor. FIGS. 7A and 7B illustrate the process for generating a rocking curve for a diffraction peak. FIG. 8 shows a subroutine for acquiring the EM tilt series. FIG. 9 shows a subroutine for determining the phase of the structure factor. FIGS. 10A and 10B show a diffraction pattern and the Fourier transform of a low dose EM image that are acquired at the same tilt angle, respectively.

Figure 1:
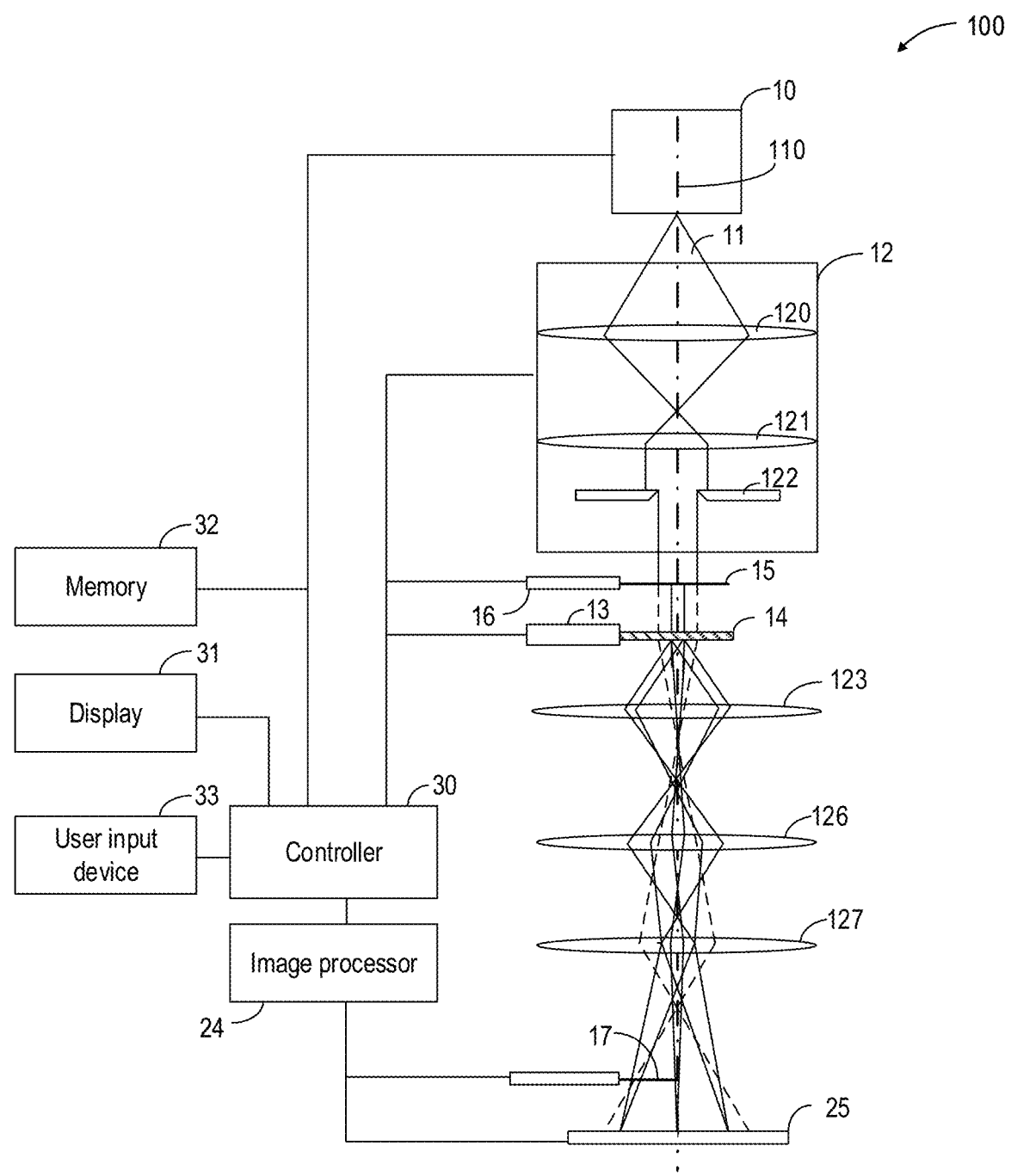
FIG. 1 illustrates a system for determining a molecular structure, according to an exemplary embodiment.

Turning to FIG. 1, a transmission electron microscopy (TEM) system 100 in accordance with an embodiment of the disclosure is shown. The TEM system 100 includes an electron source 10 that emits charged particles along emission axis 110, such as electron beam 11, towards a column 12. The electron source 10 may generate high energy electrons, that is, electrons having typical energies of between about 10 keV and 1,000 keV. In some embodiments, the column 12 may include one or more condenser lens, such as condenser lenses 120 and 121, and one or more aperture, such as aperture 122. Column 12 collimates electrons generated from electron source 10 and directs the electron beam onto sample 14. The sample 14 may be held by a sample holder 13. The sample holder 13 may adjust sample position by tilting and/or translating the sample. A condenser aperture 15 may be optionally inserted into the beam path to allow the electron beam to irradiate only a selected area of the sample.

The TEM system 100 may be used for acquiring both diffraction patterns and EM images of the sample. In the diffraction imaging mode, the scattered electrons may transmit through the sample 14 and be collected by detector 25 after travelling sequentially through objective lens 123, intermediate lens 126, and projector lens 127, as shown with the solid lines. The unscattered beam may be blocked by beam stopper 17. The collected scattered electrons be used to form an electron diffraction pattern, such as a selected area electron diffraction (SAED) pattern. In the EM imaging mode, the beam stopper 17 is removed from the beam path. The electrons transmitted from the sample 14 travel sequentially through object lens 123, intermediate lens 126 and projector lens 127, and form a TEM image of the sample on detector 25, as shown with the dashed lines.

The detector 25 may detect the received electrons and send the signal to image processor 24 to form an image. The detector 25 may include an amplifier for amplifying the signal before sending the signal to the image processor 24. In one example, the detector 25 may be a CCD camera or a CMOS camera. In some embodiments, different detectors may be used for diffraction pattern acquisition and EM image acquisition.

The controller 30 may control the operation of the TEM system 100, either manually in response to operator instructions or automatically in accordance with computer readable instructions stored in non-transitory memory (or computer readable medium) 32. The controller 30 may include a processor and be configured to execute the computer readable instructions and control various components of the TEM system 100 in order to implement any of the methods described herein. For example, the controller may adjust the imaging mode to acquire the SAED pattern or the EM image by adjusting the position of the selected area aperture 15 and the objective diaphragm 124. The controller 30 may adjust the dose of the electron beam irradiated towards the sample by adjusting current density. For example, the current density may be adjusted by adjusting the condenser optics (such as condenser lens 120 and 121). The controller 30 may adjust the profile of the incident beam by adjusting one or more apertures and/or lens in column 12. The controller 30 may adjust the sample position and/or orientation relative to the incident beam by adjusting the sample holder 13. The controller 30 may further be coupled to a display 31 to display notifications and/or images of the sample. The controller 30 may receive user inputs from user input device 33. The user input device 33 may include keyboard, mouse, or touchscreen.

Thought the TEM system is described by way of example, it should be understood that the diffraction pattern and the EM images may be acquired with other microscopy systems. In one embodiment, the diffraction patterns and the EM images may be acquired by different microscopy systems. As one example, the diffraction pattern may be X-ray diffraction pattern acquired from an X-ray diffraction system. As another example, the EM image may be acquired from a scanning transmission electron microscopy (STEM) system. The present discussion of TEM system is provided merely as an example of one suitable imaging modality.

Figure 2B:
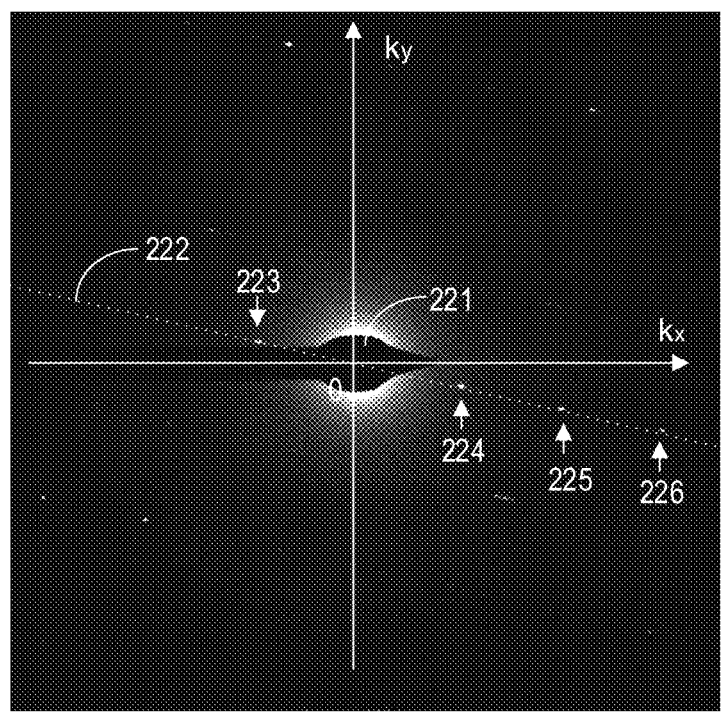
FIG. 2B shows a diffraction pattern acquired under the condition of FIG. 2A.

FIG. 2A shows positions of example reflections of a 3D crystal and the Ewald sphere in the reciprocal lattice. FIG. 2B shows a corresponding diffraction pattern acquired under the condition of FIG. 2A. In FIG. 2A, positions of the reflections are shown in the $k_x$-$k_z$ plane in the reciprocal space. The reciprocal space is defined by axes $k_x$, $k_y$, and $k_z$. The 3D crystal is irradiated with charged particle beam at direction 212. The reflections (201, 202, 203, 204, and 205) represent a subset of the reflections of the 3D crystal in the reciprocal space. Herein, the reflections (201-205) are aligned along dashed line 210 in the $k_x$-$k_z$ plane. Arch 211 is part of the Ewald sphere. Though Friedel pair of reflections may have the same amplitude, due to the curvature of the Ewald sphere, the Friedel pair of diffraction peaks may have different intensities. Reflections close (that is, within a small distance) to the Ewald sphere appear as high intensity diffraction peaks in the diffraction pattern. In this example, the reflections on the right side of axis $k_z$ (that is $k_x$>0) are closer to the Ewald sphere comparing to the reflections on the left side of the axis $k_z$ (that is $k_x$<0). In the corresponding diffraction pattern FIG. 2B, the diffraction peaks (223, 224, 225, and 226) align along line 222 in the $k_x$-$k_y$ plane of the reciprocal space. Most of the diffraction peaks appear on the right side of the image, right to the beam stopper 221 located at the origin of the diffraction pattern (that is, the origin of the reciprocal space). Diffraction peaks 223 and 224 are a Friedel pair. The Friedel mate of diffraction peaks 225 and 226 are not captured in the diffraction pattern. In other words, the intensities of the Friedel mate of diffraction peaks 225 and 226 are lower comparing to the intensity of diffraction peaks 225 and 226, respectively.

FIG. 3 shows an example method 300 for determining the molecular structure of a molecule. The molecule may be in the form of a 2D crystal or a 3D crystal. The molecular structure may be determined by solving the amplitude and phase of its structure factor. The amplitude of the structure factor may be determined based on the diffraction tilt series. The phase of the structure factor may be determined based on the diffraction tilt series and the EM tilt series.

At 302, the crystal sample is prepared. The sample may be in the form of a lamella. The lamella may be milled from a macro-crystal. For example, the lamella may be formed from the macro-crystal by milling the macro-crystal using a charged particle beam, such as a focused ion beam. The macro-crystal may be prepared by standard protein crystallization methods such as sitting or hanging drop vapor diffusion or a batch crystallization. The thickness of the lamella may be determined based on the type of the molecule under investigation. For example, the lamella thickness may be larger than the size of the unit cell of the crystal, to ensure that the molecular structure is intact. The lamella thickness may be under 300 nm. Thinner lamella may reduce the effect of dynamic scattering on determining the amplitude of the structure factor. In some embodiment, the sample may include multiple lamellae.

FIG. 4 shows an example lamella 401 prepared by milling a macro-crystal with the focused ion beam. For each lamella, multiple locations may be imaged for acquiring the diffraction patterns and the EM images. For example, in FIG. 4, the solid squares on the lamella indicate locations used for EM image acquisition, and the dashed squares on the lamella indicate locations used for diffraction pattern acquisition. The imaging area for diffraction pattern and the EM image may be the same. The pixel resolution of the images may be determined based on a desired resolution of the molecular structure. For example, a desired resolution of 5 Angstrom in the molecular structure may require a pixel resolution of 2.5 Angstrom in the EM image to satisfy the Nyquist condition. The imaging area may be determined by the radiation hardness of the crystal. In one example, in the imaging area may be 0.01-1 um$^2$.

At 303, the imaging system, such as the imaging system of FIG. 1, is set up for acquiring the images. Setting the imaging system may include loading a lamella into the system. Setting the imaging system may include performing coma-free alignment before imaging the sample.

At 304, the diffraction tilt series of the sample are acquired. The diffraction tilt series is a 3D dataset including multiple 2D diffraction patterns. The diffraction patterns may be electron diffraction patterns acquired with a current density under 0.1 el/Å$^2$. For example, the current density is 0.01 el/Å$^2$.

In one embodiment, the lamella may be continuously tilted about a tilt axis at a tilt speed. The tilt axis may be orthogonal to the incident beam. The tilt speed may be determined based on the desired sampling resolution and the acquisition speed for a diffraction pattern. A diffraction pattern may be formed when the lamella is tilted every tilt angle difference AO. In other words, each diffraction pattern spans a tilt angle difference AO. The tilt angle difference AO between consecutive acquired diffraction patterns may be determined based on the desired sampling resolution. For example, the tilt angle difference AO may decrease with the increased desired sampling resolution. Further, the tilt angle difference AO may be adjusted based on an oversampling rate to obtain a finer slicing. The tilt angle difference AO may be inversely proportional to the oversampling rate. In one example, the tilt angle difference AO may be 3 degrees. That is, one diffraction pattern is acquired during every 3-degree angular tilt. In another embodiment, the lamella may be tilted discretely. For example, the lamella may be first tilted by the tilt angle difference AO. The charged particle beam is then irradiated toward the sample to acquire a diffraction pattern when the sample is stationary relative to the beam.

FIG. 5 illustrates positions of a lamella at different tilt angles in the real space defined by axes x, y, and z. The lamella may be irradiated with a charged particle beam indicated by arrow 501, along the z axis. The lamella may be tilted around an axis orthogonal to the incident beam. For example, the lamella may be tilted or rotated about the y-axis, as indicated by arrow 510. The y-axis may correspond to a rotation axis of the sample holder. The tilt angle may be defined by the angle between the lamella and the x-axis. For example, at position 502, the lamella has a tilt angle of zero. At position 504, the lamella has a positive tilt angle 505. At position 503, the lamella has a negative tilt angle 506.

In some embodiments, the range of the tilt angle may be limited by the maximum rotation range of the sample holder. The tilt angle range may be the same as the maximum rotation range of the sample holder. For example, the diffraction tilt series may be acquired while tilting the lamella from −70 degrees to the +70 degrees. In one embodiment, the whole diffraction tilt series may be acquired at the same location of the sample. In another embodiment, the diffraction tilt series may be acquired from multiple locations of the sample. For example, diffraction patterns with tilt angles ranging from −70 degrees to 0 degree may be acquired at a first location of the sample, diffraction patterns with tilt angles ranging from 0 degrees to 70 degrees may be acquired at a second location of the sample. In order to avoid damage of the molecular structure, the number of diffraction patterns acquired at each location may be limited by the dosage of the electron beam. In some embodiments, the diffraction tilt series may be acquired from multiple lamellae prepared at 302.

In some embodiments, the diffraction tilt series may include diffraction patterns acquired by tilting along two orthogonal axes. For example, a first group of diffraction patterns may be acquired by tilting the sample along the y-axis as shown in FIG. 5, and a second group of diffraction patterns may be acquired by tilting the sample along the x-axis. By including diffraction patterns acquired while tilting along two orthogonal axes, more accurate profile of the diffraction peak in the 3D reciprocal space may be obtained. Further, the effect of dynamical scattering on determining amplitude of the structure factor may be reduced.

At 306, amplitudes of the structure factors may be calculated based on the diffraction tilt series. The amplitudes of the structure factors may be determined based on the intensities of the diffraction peaks in the diffraction tilt series. Each diffraction peak corresponds to a reflection in the reciprocal space. Due to the finite size of the crystal and/or the beam divergence, the diffraction peak may not be a delta function, but occupies a volume in the reciprocal space. In other words, the intensity of the diffraction peak spreads (that is, have nonzero intensity) within the volume in the reciprocal space. Therefore, a single diffraction pattern cannot capture the full angular spot profile of the diffraction peak, and intensities of the diffraction peak in multiple tilt angles are used for solving the structure factor amplitudes.

FIG. 6 and FIGS. 7A-7B show the structure factor amplitude calculation in detail. The amplitudes of the structure factors may be determined based on the angular spot profile (or rocking curve) of each diffraction peak over a subset of tilt angles at which the intensities of the diffraction peak are nonzero. Each rocking curve is generated by fitting the intensities of a diffraction peak over multiple tilt angles.

At 601, the intensities of each diffraction peak in the diffraction tilt series are determined. Determining the intensities of the diffraction peaks may include identify each diffraction peak by grouping high intensity spots belonging to a particular diffraction peak, and calculating the intensity of the diffraction peak in a diffraction pattern (or at a tilt angle) based on the total intensity of the high intensity spots of the diffraction peak in the diffraction pattern.

At 602, the diffraction tilt series may be thresholded. For example, after removing the background, low intensity datapoints (or pixels) in the diffraction tilt series are filtered out by thresholding. The background may be caused by inelastically scattered electrons, electrons scattered from the specimen support film, or the non-crystalline parts of the specimen. In one example, the background may be removed via low-pass filtering. After removing low intensity datapoints, only datapoints with intensity higher than a threshold level are preserved. In one embodiment, the threshold level may be predetermined. In another embodiment, the threshold level may be determined based on the maximum intensity in the diffraction tilt series. For example, the threshold level may be 10% percent of the maximum intensity. In yet another embodiment, the threshold level may be determined by the sensitivity of the imaging system. For example, the threshold level may be the noise level of the diffraction tilt series.

At 604, the diffraction peaks in the diffraction tilt series are identified. For example, identifying the diffraction peaks may include identifying high intensity spots in each diffraction pattern, and identifying the high intensity spots that belong to the diffraction peaks. The high intensity spot is an area in the diffraction pattern which includes a group of high intensity datapoints (or pixels). Identifying the high intensity spots may include determining the location and the total intensity of the high intensity spots. The high intensity spots may not overlap with each other. In one embodiment, identifying the high intensity spots may include identifying the boundary of each high intensity spot. The total intensity of each high intensity spot may be calculated by averaging or summing the intensity of all datapoints (or pixels) with in the boundary of the high intensity spot. The location of the high intensity spot may be the geometric center of the high intensity spot boundary in the reciprocal space.

Identifying the high intensity spots that belong to each diffraction peak may include grouping the high intensity spots based on their intensities and locations. A diffraction peak may be captured in multiple diffraction patterns. In one embodiment, high intensity spots belonging to a diffraction peak may be identified based on the distance of the high intensity spots in the reciprocal space. For example, the high intensity spots within a threshold distance from each other in the reciprocal space are determined to belong to one diffraction peak. The distance between the high intensity spots may be determined based on the location of the high intensity spot in the diffraction pattern and the tilt angle of the diffraction pattern. The high intensity spots of each diffraction peak may further be identified based on the total intensity of the high intensity spots. For example, the total intensity first increases, then decreases, with increased tilt angle.

At 606, the intensities of the diffraction peaks in each diffraction pattern is calculated. For example, the intensity of a diffraction peak in the diffraction pattern (or at a tilt angle) is the total intensity of the high intensity spots of the diffraction peak within the diffraction pattern.

FIG. 7A illustrates intensities of an example diffraction peak in the diffraction tilt series. In FIG. 7A, diffraction tilt series 701 includes multiple diffraction patterns acquired at multiple tilt angles θ. One example high intensity spot is shown on each diffraction patterns 711, 712, 713, and 714. The high intensity spots in diffraction patterns 711-714 are determined to belong to the same diffraction peak because they located close to each other in the reciprocal space. The grey level of the high intensity spot indicates the total intensity of the high intensity spot, or the intensity of the diffraction peak in the diffraction pattern. The high intensity spot is darker with higher total intensity. The total intensity first increases, then decreases with increased tilt angle.

At 608, the rocking curve (or an angular spot profile) for each diffraction peak may be generated based on the intensities of the diffraction peak in multiple diffraction patterns. For example, the rocking curve may be generated by fitting the intensities of the diffraction peak with a curve, such as a Gaussian curve.

FIG. 7B shows an example rocking curve 725 generated based on the intensities of the diffraction peaks from tilt angles $\theta_1$ to $\theta_2$ of FIG. 7A. In FIG. 7B, the x-axis is the tilt angle. The y-axis is the intensity of the diffraction peak, and the intensity increases as indicated by the arrow. In this example, because the diffraction patterns are acquired while continuously rotating the lamella, the total intensity of each high intensity spot is in the form of a bar with the width of tilt angle difference AO. The heights of bars 721, 722, 723, and 724 correspond to the total intensity of the high intensity spots in diffraction patterns 711, 712, 713, and 714, respectively. The intensities of the diffraction peak are above zero from tilt angles $\theta_1$ to $\theta_2$, and are zero elsewhere. The rocking curve may be generated by fitting the intensities of the diffraction peak with a curve. For example, total intensities of the high intensity spots may be fitted with Gaussian curve $$I(\theta) = I^{max} e^{-0.5\left(\frac{\theta-\theta_0}{\sigma}\right)^2},$$

wherein $I^{max}$ is the maximum intensity of the diffraction peak, $\theta_0$ is the tilt angle with the maximum intensity of $I^{max}$, and σ is the standard deviation of the Gaussian curve. The standard deviation a may be obtained by fitting the intensities of the diffraction peak with the Gaussian curve. The location of the diffraction peak in the reciprocal space may be determined based on the rocking curve. For example, the location of the diffraction peak in the reciprocal space may be determined based on the tilt angle with the maximum intensity (such as $\theta_0$ in FIG. 7B) and the location of the high intensity spot with the maximum intensity in the diffraction pattern (such as the location of the diffraction peak in diffraction pattern 713 of FIG. 7A).

At 610, the amplitudes of the structure factors may be determined based on the rocking curves. The amplitude of the structure factor at a spatial frequency k may be calculated by taking the square root of the rocking curve at a corresponding tilt angle θ'. That is, $F(k)=\sqrt{I(\theta')}$, wherein F(k) is the amplitude of the structure factor at spatial frequency k (that is, location of the diffraction peak) in the reciprocal space and I(θ') is the intensity of the rocking curve at tilt angle θ'. The tilt angle θ' may be calculated based on the spatial frequency k. Note that for absolute structure factor determination, proper integration over the rocking curve and scaling are required. For the current invention, only the relative strength of the structure factors corresponding with the Friedel mates are of interest, therefore integration and scaling are not required.

In this way, the amplitudes of the structure factors may be determined based on the rocking curves of the diffraction peaks. The rocking curves are generated by fitting the intensities of the diffraction peaks in the diffraction tilt series. The location of the diffraction peak in the reciprocal space may be determined based on the locations of its corresponding high intensity spots in the diffraction patterns. The intensity of the diffraction peak at a particular tilt angle may be the total intensity of the high intensity spot at the tilt angle.

Turning back to FIG. 3, at 308, the EM tilt series are acquired. The EM tilt series may include both low dose and high dose EM images of the sample at multiple tilt angles. For example, at each tilt angle, a low dose and a high dose EM images at the same location of the sample are acquired. FIG. 8 shows an example subroutine 800 for acquiring the multiple EM images.

At 802, the tilt angles for the multiple EM images are determined. The range of the tilt angles of EM tilt series may be the same as the range of the tilt angles of the diffraction tilt series at 304 of FIG. 3. The spacing between the EM tilt series, that is, the tilt angle difference between consecutive EM images, may be different from the diffraction tilt series. In one embodiment, spacing of the tilt angles for EM imaging may be determined based on the tilt angle difference AO of the diffraction tilt series. The spacing of the tilt angles may further depend on the available imaging area.

At 804, the lamella sample may be shifted to a new location and tilted to one of the tilt angles determined at 802. The lamella may be shifted and tilted by operating the sample holder. In some embodiments, the new location may be a location on a different lamella. In one embodiment, the lamella may be tilted around the same tilt axis as the diffraction tilt series. In another embodiment, the lamella may be tilted around a different tilt axis from the diffraction tilt series. The tilt axis may be orthogonal to the incident beam axis.

At 806, a low dose rate EM image of the sample may be acquired. The low dose EM image may be acquired using reduced current density. For example, the low dose EM images may be acquired with current density under 0.1 el/Angstrom$^2$. The low dose EM images may be acquired with a current density of 0.01 el/Angstrom$^2$. The low dose EM image includes Bragg-reflections from the crystal lattice.

At 808, immediately after acquiring the low dose EM image, a high dose EM image of the sample may be acquired without adjusting the sample location. The high dose EM image may be acquired using a current density the low dose EM image acquisition. For example, the current density for high dose EM imaging may be 10-100 el/Angstrom$^2$. By irradiating the area of the lamella sample with high energy electrons, the molecular structure within the imaging region may be damaged. As such, the high dose EM image does not include Bragg-reflections from the crystal lattice. From the high dose EM images, the contrast transfer function (CTF), which reflects aberration of the imaging system, may be derived. FIG. 10B shows the Fourier transform of a low dose EM image. The Thon rings around the center of FIG. 10B may be caused by aberrations, like defocus, spherical aberration and astigmatism of the imaging system. Due to the low dose, the Thon rings are only poorly visible in the EM image comparing to the diffraction pattern of FIG. 10A, which is acquired at the same tilt angle as the low dose EM image. Therefore, a high dose EM image is required for calculating the CTF. The diffraction peaks in area 1001 of FIG. 10A correspond to the high intensity signals in area 1002 FIG. 10B.

At 810, subroutine 800 determines whether EM images at all tilt angles determined at 802 are acquired. If all tilt angles have been imaged, subroutine 800 ends. Otherwise, EM images at another location and tilt angle are acquired.

In one embodiment, the diffraction tilt series is acquired while continuously tilting the sample relative to the incident beam, and each EM image of the multiple EM images is acquired while the sample is stationary relative to the incident beam. As such, each diffraction pattern corresponds to a range of the tilt angle, while each EM image corresponds to a discrete tilt angle. The sample is kept stationary during EM acquisition because tilting the sample during EM acquisition may smear out the high-resolution information in the EM images and reduce the resolution in the Fourier transformed EM images.

Turning back to FIG. 3, at 310, the phases of the structure factors may be determined based on the EM tilt series acquired at 308 and the intensities of diffraction peaks in the diffraction patterns. FIG. 9 shows an example subroutine 900 for determining the structure factor phases. In particular, a 2D structure factor phases at a tilt angle may be solved based on the Fourier transform of the low dose EM image, the CTF derived from the high dose EM images acquitted at the tilt angle, and the intensities of the Friedel pairs of the diffraction peak at the tilt angle. The 2D structure factor phases at multiple tilt angles may then be reconstructed into a 3D dataset of the phases of the structure factors.

At 902, the high dose and low dose EM images acquired at a selected tilt angle from step 308 may be loaded into the memory. The selected angle may be one of the tilt angles determined at 802 of FIG. 8.

At 904, the CTF may be derived from the high dose EM image. In one embodiment, the CTF may be derived based on Fourier transform of the high dose EM image. The CTF may further be adjusted based on the tilt angle to address the non-uniform focus across the imaged area in the tilted sample (such as the lamella).

At 906, the structure factor phases at the selected tilt angle (that is, the 2D structure phase) may be calculated based on the Fourier transform of the low dose EM image, the CTF derived at 904, and the intensities of the Friedel pairs of the diffraction peak at the selected tilt angle.

For example, a single Fourier component of the low dose EM image may be expressed as:

$$I_\theta(x) = (-F(k)+F(-k))\cos\gamma(k)\sin(kx+\alpha_k) - (F(k)+F(-k))\sin\gamma(k)\cos(kx+\alpha_k), \quad \text{Equation 1}$$

wherein $I_\theta(x)$ is acquired at tilt angle $\theta$, x is the location in the real space, k is the spatial frequency in the reciprocal space, F(k) and F(-k) are amplitudes of Friedel pairs of the structure factor, $\gamma(k)$ is the CTF derived at 904, and $\alpha_k$ is the phase of the structure factor at spatial frequency k. F(k) and F(-k) are proportional to the square root of the intensities of the Friedel pairs of the diffraction peak in a diffraction pattern. As shown in FIG. 2B, the intensities of the Friedel pairs of the diffraction peak in a diffraction pattern may be different because the distances between the reflections and the Ewald sphere are not centrosymmetric relative to the origin. Therefore, amplitudes of Friedel pairs of the structure factor, F(k) and F(-k), may be different. In one embodiment, the amplitude of the structure factor at any given spatial frequency may be obtained based on the rocking curves of the diffraction peaks. For example, as shown in FIG. 7B, the amplitude of structure factor F(k') may be the square root of the rocking curve I($\theta$'). In another embodiment, without generating the rocking curve, F(k') may be directly obtained from the intensity of the diffraction peak in the diffraction pattern. For example, in FIG. 7B, F(k') may be set to the square root of intensity 731. In another example, if the diffraction pattern and the EM image are taken at the same discrete angle θ', the amplitude of structure factor may be set as the square root of the diffraction peak intensity in the diffraction pattern.

Equation 1 may be further simplified:

$$I_\theta(x) = a(k)\sin(kx + \alpha_k) + b(k)\cos(kx + \alpha_k) =$$
$$R(k)\sin(kx + \alpha_k + \beta(k)) =$$
$$R(k)\cos(kx + \alpha_k + \beta(k) + \pi/2),$$

Equation 2 wherein $a(k) = (-F(k) + F(-k))\cos\gamma(k),$ $b(k) = -(F(k) + F(-k))\sin\gamma(k),$ $\beta(k) = \frac{b(k)}{a(k)} = \arctan\left[\frac{-(F(k) + F(-k))}{-F(k) + F(-k)} \cdot \frac{\sin\gamma(k)}{\cos\gamma(k)}\right],$ and $R = \sqrt{a(k)^2 + b(k)^2}.$ As such, the phase $\alpha_k$ of the structure factor at a tilt angle θ may be solved based on Fourier transform of the low dose EM image $I_\theta(x)$, the intensities of the Friedel pair of the structural factor, and the CTF. The difference in the intensities of the Friedel pair of the structure factor (or the Friedel pair of the diffraction peak) causes an extra phase shift of β(k)+π/2. When the intensities of the Friedel pair are equal, that is F(k')=F(-k'), β(k')=-π/2, there is no extra phase shift.

At 908, the phase origin is established in the 2D structure factor phase. In particular, the 2D structure factor phase is adjusted to a common origin of the coordinate system in real space, so that the 2D structure factor phase with different tilt angles may be merged to obtain the 3D phase of the structure factor. In one embodiment, the phase origin may be established by requiring the 2D structure factor phase on the tilt axis having the same phase. For example, if the EM images are acquired by tilting the sample about the y-axis in the real space, the 2D structure factor phase may be adjusted so that the phases of the reflections along the $k_y$ axis of the reciprocal space are the same.

At 910, subroutine 900 checks whether all EM images are processed. In other words, subroutine 900 checks whether all tilt angles for EM imaging are processed. If the answer is no, another tilt angle is selected at 912, and the phase of the structure factor at the selected tilt angle is calculated. Otherwise, if all EM images are processed, the 3D phase of the structure factor may be constructed at 914 based on the 2D structure factors at various angles. Constructing the structure factor phase may include merging the 2D structure factor phases based on the tilt angle relative to the crystal axes.

Turning back to FIG. 3, at 312, the molecular structure may be reconstructed based on the amplitudes of the structure factors determined at 306 and the phases of the structure factors determined at 310. The molecular structure may include atomic coordinates of the crystal in the real space. In one example, the molecular structure may be determined based on the inverse Fourier transform of the 3D structure factor amplitude and the 3D structure factor phase. In some embodiments, the molecular structure may be further refined based on the acquired diffraction tilt series. For example, atom location in the molecular structure may be fine-tuned to minimize the difference between a calculated diffraction pattern and the observed diffraction pattern. The calculated diffraction may be determined by the Fourier transform the solved molecular structure, and the observed diffraction pattern from the diffraction tilt series.

In some embodiments, the EM tilt series may be acquired before acquiring the diffraction tilt series. In some embodiments, the tilt angle range in the diffraction tilt series or the EM tilt series may be decreased based on the known symmetry of the crystal. For example, a first diffraction tilt series covering a first tilt angle range may be acquired. A second diffraction tilt series covering a second tilt angle range, larger than the first tilt angle range, may be constructed based on the first diffraction tilt series and the known symmetry of the crystal.

In this way, the molecular structure of a 3D crystal may be solved based on the diffraction tilt series and the EM tilt series. The diffraction tilt series may include the diffraction patterns acquired at a first range of tilt angles, and the EM tilt series may include the low dose and high dose EM images acquired at a second range of tilt angles. The 3D structure factor amplitude may be determined based on the integration of the rocking curves over the tilt angles. The 3D structure factor phase may be solved based on the EM tilt series and the 3D structure factor amplitude. The molecular structure may be obtained based on the amplitude and the phase of the structure factor.

The technical effect of acquiring the diffraction patterns is to obtain the amplitudes of the structure factors. The technical effect of determining the amplitudes of the structure factors based on intensities of a diffraction peak in the multiple diffraction patterns is to capture the total intensity of the diffraction peak. The technical effect of determining the phases of the 2D structure factor based on the intensities of the Friedel pairs of the diffraction peak in the diffraction pattern is that the extra phase shift due to unequal intensities of the Friedel pairs may be taken into account. The technical effect of acquiring high dose EM image and the low dose EM image at each tilt angle is that the CTF corresponding to the low dose EM image may be determined based on the high dose EM image.

In one embodiment, a method for determining a molecular structure of a sample includes acquiring multiple diffraction patterns of the sample while titling the sample in a tilt angle range; determining an amplitude of a structure factor based on intensities of a diffraction peak in the multiple diffraction patterns; acquiring an electron microscopy (EM) image of the sample; determining a phase of the structure factor based on the EM image and the intensities of the diffraction peak in the multiple diffraction patterns; and determining the molecular structure of the sample based on the amplitude of the structure factor and the phase of the structure factor. In a first example of the method, after acquiring the EM image, acquiring a second EM image of the sample with a current density higher than a current density for acquiring the EM image, and determining the phase of the structure factor based further on the second EM image. A second example of the method optionally includes the first example and further includes determining a contrast transfer function (CTF) based on the second EM image, and determining the phase of the structure factor based on the second EM image includes determining the phase of the structure factor based on the CTF. A third example of the method optionally includes one or more of the first and second examples, and further includes wherein acquiring the EM image includes acquiring the EM image at a tilt angle within the tilt angle range, and determining the phase of the structure factor based on the EM image and the intensities of the diffraction peak in the multiple diffraction patterns includes determining the phase of the structure factor at the tilt angle based on the EM image and an intensity of the diffraction peak at the tilt angle. A fourth example of the method optionally includes one or more of the first through third examples, and further includes wherein the phase of the structure factor at the tilt angle is further determined based on an intensity of a Friedel mate of the diffraction peak. A fifth example of the method optionally includes one or more of the first through fourth examples, and further includes wherein the intensity of the diffraction peak and the intensity of the Friedel mate of the diffraction peak are different. A sixth example of the method optionally includes one or more of the first through fifth examples, and further includes wherein determining the amplitude of the structure factor based on intensities of the diffraction peak includes calculating the amplitude of the structure factor at a particular tilt angle by taking a square root of an intensity of the diffraction peak at the tilt angle. A seventh example of the method optionally includes one or more of the first through sixth examples, and further includes wherein determining the amplitude of the structure factor based on intensities of the diffraction peak includes fitting the intensities of the diffraction peak with a curve, and calculating the amplitude of the structure factor at a particular tilt angle by taking a square root of an intensity of the curve at the tilt angle. An eighth example of the method optionally includes one or more of the first through seventh examples, and further includes identifying the diffraction peak by thresholding the multiple diffraction patterns. A ninth example of the method optionally includes one or more of the first through eighth examples, and further includes wherein intensities of the diffraction peak in the multiple diffraction patterns are nonzero. A tenth example of the method optionally includes one or more of the first through ninth examples, and further includes wherein the sample is a lamella.

In another embodiment, A non-transitory computer-readable medium comprising instructions that, when executed, cause a processor to: acquire multiple diffraction patterns of a sample while titling the sample in a tilt angle range; determine amplitudes of structure factors based on intensities of each diffraction peak in the multiple diffraction patterns; acquire multiple electron microscopy (EM) images of the sample at multiple tilt angles; determine phases of the structure factors based on the multiple EM images and the intensities of diffraction peaks; and determine a molecular structure of the sample based on the amplitudes of the structure factors and the phases of the structure factors. In a first example, wherein determine phases of the structure factors based on the multiple EM images and the intensities of the diffraction peaks includes determine phases of the structure factors based on the multiple EM images and the intensities of Friedel pairs of the diffraction peaks. A second example of the non-transitory computer-readable medium optionally includes the first example and further includes, wherein determine phases of the structure factors based on the multiple EM images and the intensities of the diffraction peaks includes: determine intensities of Friedel pairs of the structure factors based on the intensities of the diffraction peaks, and determine phases of the structure factors based on the multiple EM images and the intensities of Friedel pairs of the structure factors. A third example of the non-transitory computer-readable medium optionally includes one or more of the first and second examples, and further includes instructions that, when executed, cause the processor to acquire the multiple diffraction patterns at a first location of the sample, and acquire the multiple EM images a second location of the sample.

In yet another embodiment, a system for determining a molecular structure of a sample includes: an electron source for generating an electron beam; a sample holder for tilting the sample relative to the electron beam; a first detector for acquiring a diffraction pattern of the sample; a second detector for acquiring an electron microscopy (EM) image of the sample; a controller with computer readable instructions stored in a non-transitory medium, configured to: tilt the sample via the sample holder within a tilt angle range; direct the electron beam towards a first location of the sample and acquire multiple electron diffraction patterns of the sample via the first detector while the sample is tilted; determine an amplitude of a structure factor based on intensities of a diffraction peak in the multiple diffraction patterns; direct the electron beam to a second location of the sample and acquire a low dose EM image of the sample via the second detector; determine a phase of the structure factor based on the low dose EM image and the intensities of the diffraction peak; and determine the molecular structure of the sample based on the amplitude of the structure factor and the phase of the structure factor. In a first example of the system, the controller is further configured to: position the sample at a first tilt angle before directing the electron beam to the second location of the sample and acquiring the low dose EM image; acquire a high dose EM image at the second location of the sample after acquiring the low dose EM image; and wherein determine the phase of the structure factor based on the low dose EM image and the intensities of the diffraction peak includes determine the phase of the structure factor at the first tilt angle based on the low dose EM image, the intensities of the diffraction peak, and the high dose EM image. A second example of the system optionally includes the first example and further includes wherein the controller is further configured to tilt the sample along two orthogonal axes, and acquiring the multiple diffraction patterns includes acquiring a first group of diffraction patterns while tilting the sample along one of the two orthogonal axes, and acquiring a second group of diffraction patterns while tilting the sample along the other of the two orthogonal axes. A third example of the system optionally includes one or more of the first and second examples, and further includes wherein the controller is further configured to: position of the sample at a second tilt angle after acquiring the high dose EM image; direct the electron beam to a third location of the sample positioned at the second tilt angle, and sequentially acquire a second low dose EM image and a second high dose EM image of the sample; determine the phase of the structure factor at the second tilt angle based on the second low dose EM image, the second high dose EM image, and the intensities of the diffraction peak; and wherein determine the molecular structure based on the amplitude of the structure factor and the phase of the structure factor includes determine the molecular structure based on the amplitude of the structure factor, the phase of the structure factor at the first tilt angle, and the phase of the structure factor at the second tilt angle. A fourth example of the system optionally includes one or more of the first and third examples, and further includes wherein the controller is configured to acquire the multiple diffraction patterns while continuously tilting the sample via the sample holder.

What is claimed is:
1. A method for determining a molecular structure of a sample, comprising:
    acquiring multiple diffraction patterns of the sample while tilting the sample relative to an incident beam;

determining an amplitude of a structure factor based on intensities of a diffraction peak in the multiple diffraction patterns;

acquiring a first electron microscopy (EM) image of the sample;

after acquiring the first EM image, acquiring a second EM image with a current density higher than a current density for acquiring the first EM image;

determining a phase of the structure factor based on the first EM image, the second EM image and the intensities of the diffraction peak in the multiple diffraction patterns; and determining the molecular structure of the sample based on the amplitude of the structure factor and the phase of the structure factor.

2. The method of claim 1, further comprising determining a contrast transfer function (CTF) based on the second EM image, and determining the phase of the structure factor based on the second EM image includes determining the phase of the structure factor based on the CTF.

3. The method of claim 1, wherein acquiring the first EM image includes acquiring the first EM image at a tilt angle, and determining the phase of the structure factor based on the first EM image, the second EM image, and the intensities of the diffraction peak in the multiple diffraction patterns includes determining the phase of the structure factor at the tilt angle based on the first EM image and an intensity of the diffraction peak at the tilt angle.

4. The method of claim 3, wherein the phase of the structure factor at the tilt angle is further determined based on an intensity of a Friedel mate of the diffraction peak.

5. The method of claim 4, wherein the intensity of the diffraction peak and the intensity of the Friedel mate of the diffraction peak are different.

6. The method of claim 1, wherein determining the amplitude of the structure factor based on intensities of the diffraction peak includes calculating the amplitude of the structure factor at a particular tilt angle by taking a square root of an intensity of the diffraction peak at the tilt angle.

7. The method of claim 1, wherein determining the amplitude of the structure factor based on intensities of the diffraction peak includes fitting the intensities of the diffraction peak with a curve, and calculating the amplitude of the structure factor at a particular tilt angle by taking a square root of an intensity of the curve at the tilt angle.

8. The method of claim 1, further includes identifying the diffraction peak by thresholding the multiple diffraction patterns.

9. The method of claim 1, wherein intensities of the diffraction peak in the multiple diffraction patterns are nonzero.

10. The method of claim 1, wherein the sample is a lamella.

11. A non-transitory computer-readable medium comprising instructions that, when executed, cause a processor to:
acquire multiple diffraction patterns of a sample while titling the sample relative to an incident beam;
determine amplitudes of structure factors based on intensities of each diffraction peak in the multiple diffraction patterns;
acquire multiple electron microscopy (EM) images of the sample at multiple tilt angles;
determine intensities of Friedel pairs of the structure factors based on the intensities of the diffraction peaks;
determine phases of the structure factors based on the multiple EM images and the intensities of Friedel pairs of the structure factors; and
determine a molecular structure of the sample based on the amplitudes of the structure factors and the phases of the structure factors.

12. The non-transitory computer-readable medium of claim 11, wherein determine the phases of the structure factors based on the multiple EM images and the intensities of the diffraction peaks includes determine phases of the structure factors based on the multiple EM images and the intensities of Friedel pairs of the diffraction peaks.

13. The non-transitory computer-readable medium of claim 11, further comprising instructions that, when executed, cause the processor to acquire the multiple diffraction patterns at a first location of the sample, and acquire the multiple EM images a second location of the sample.

14. A system for determining a molecular structure of a sample, comprising:
an electron source for generating an electron beam;
a sample holder for tilting the sample relative to the electron beam;
a first detector for acquiring a diffraction pattern of the sample;
a second detector for acquiring an electron microscopy (EM) image of the sample;
a controller with computer readable instructions stored in a non-transitory medium, configured to:
direct the electron beam towards a first location of the sample and acquire multiple electron diffraction patterns of the sample via the first detector while the sample is tilted relative to the electron beam via the sample holder;
determine an amplitude of a structure factor based on intensities of a diffraction peak in the multiple diffraction patterns;
direct the electron beam to a second location of the sample and acquire a low dose EM image of the sample via the second detector;
determine a phase of the structure factor based on the low dose EM image and the intensities of the diffraction peak; and
determine the molecular structure of the sample based on the amplitude of the structure factor and the phase of the structure factor.

15. The system of claim 14, wherein the controller is further configured to:
position the sample at a first tilt angle before directing the electron beam to the second location of the sample and acquiring the low dose EM image;
acquire a high dose EM image at the second location of the sample after acquiring the low dose EM image; and
wherein determine the phase of the structure factor based on the low dose EM image and the intensities of the diffraction peak includes determine the phase of the structure factor at the first tilt angle based on the low dose EM image, the intensities of the diffraction peak, and the high dose EM image.

16. The system of claim 14, wherein the controller is further configured to tilt the sample along two orthogonal axes, and acquiring the multiple diffraction patterns includes acquiring a first group of diffraction patterns while tilting the sample along one of the two orthogonal axes, and acquiring a second group of diffraction patterns while tilting the sample along the other of the two orthogonal axes.

17. The system of claim 15, wherein the controller is further configured to:
position of the sample at a second tilt angle after acquiring the high dose EM image;

direct the electron beam to a third location of the sample positioned at the second tilt angle, and sequentially acquire a second low dose EM image and a second high dose EM image of the sample;

determine the phase of the structure factor at the second tilt angle based on the second low dose EM image, the second high dose EM image, and the intensities of the diffraction peak; and wherein determine the molecular structure based on the amplitude of the structure factor and the phase of the structure factor includes determine the molecular structure based on the amplitude of the structure factor, the phase of the structure factor at the first tilt angle, and the phase of the structure factor at the second tilt angle.

18. The system of claim 14, wherein the controller is configured to acquire the multiple diffraction patterns while continuously tilting the sample via the sample holder.

* * * * *